W. S. ROMME.
FLYING MACHINE.
APPLICATION FILED MAR. 14, 1910.
1,041,876.
Patented Oct. 22, 1912.
3 SHEETS—SHEET 3.
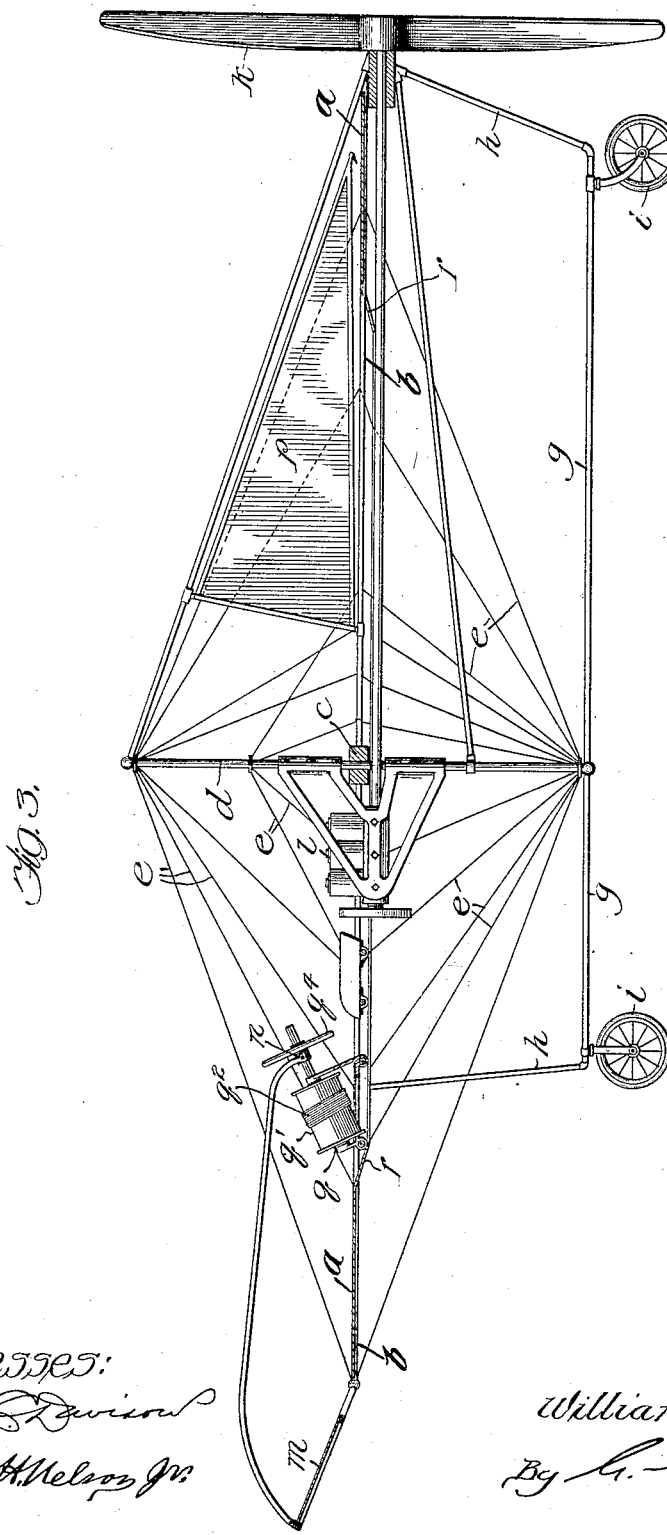

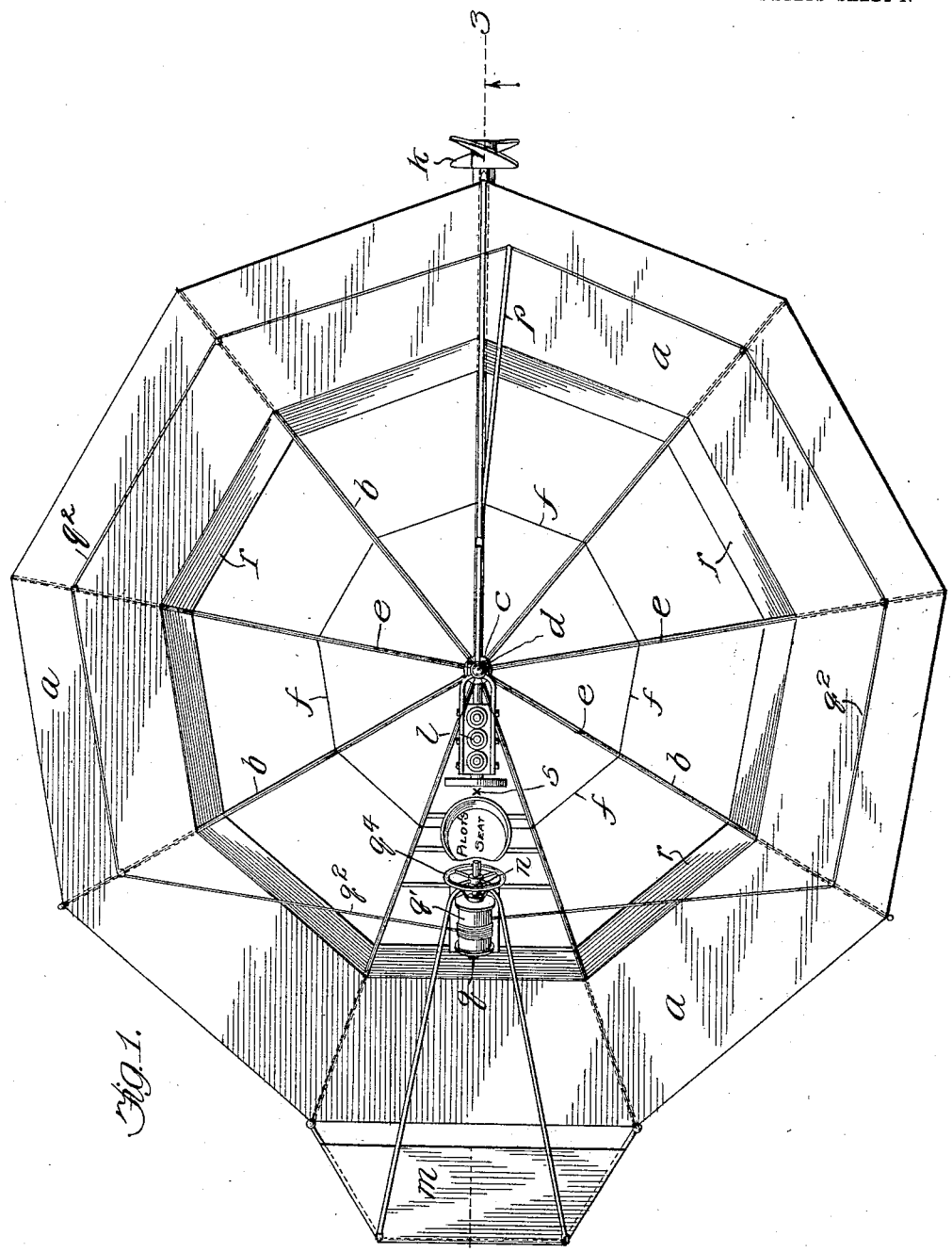

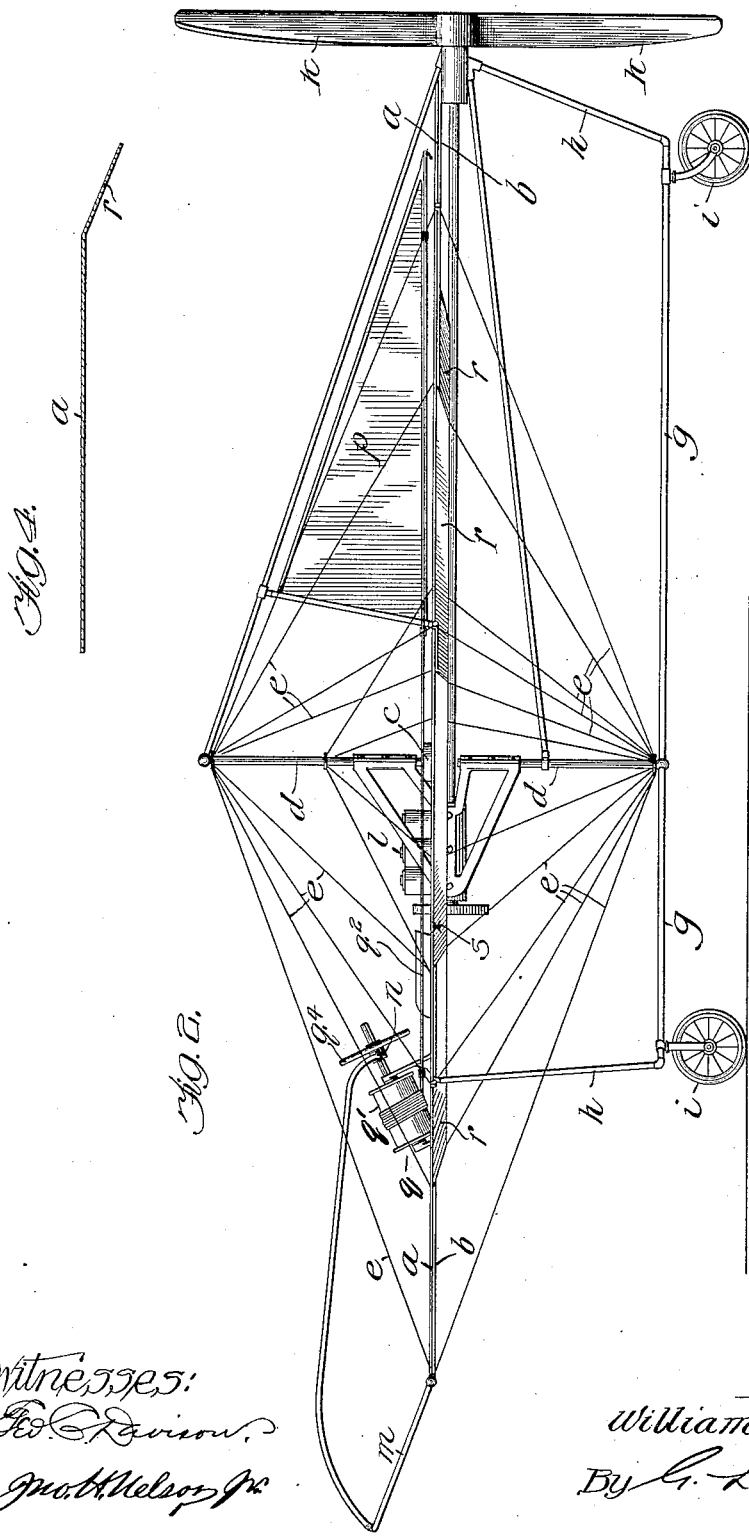

UNITED STATES PATENT OFFICE.

WILLIAM S. ROMME, OF NEW YORK, N. Y., ASSIGNOR TO McCORMICK-ROMME COMPANY, OF CHICAGO, ILLINOIS, A CORPORATION OF ILLINOIS.

FLYING-MACHINE.

1,041,876.  Specification of Letters Patent.  Patented Oct. 22, 1912.

Application filed March 14, 1910. Serial No. 549,218.

*To all whom it may concern:*

Be it known that I, WILLIAM S. ROMME, a citizen of the United States, residing at New York city, in the county of New York and State of New York, have invented a certain new and useful Improvement in Flying-Machines, of which the following is a full, clear, concise, and exact description, reference being had to the accompanying drawings, forming a part of this specification.

My invention relates to flying machines or air ships and is of particular service in connection with that class of air ships in which bodies of extended surfaces are employed as buoying elements that coöperate with suitable propelling mechanisms to effect progress of the ships through the air and that also coöperate with suitable steering mechanism to determine the directions in which the ships are to travel with reference to the vertical and the horizontal. These buoying elements are termed aeroplanes whether they lie in true planes, geometrically speaking, or are deflected with reference to true planes as by being curved in section, and in practising my invention, I do not limit myself to buoying elements which lie in true geometrical planes. Neither do I limit my present invention to air ships in which gas bags are absent, as it has hitherto been proposed to equip air ships having aeroplanes with gas bags.

My invention, in one of its aspects, relates to that class of air ships or flying machines employing aeroplanes, whose surfaces are distributed about the centers of gravity of the ships, or rather are distributed about lines perpendicular to the aeroplanes and including the centers of gravity. However, I do not desire to limit myself to the precise vertical positions of the centers of gravity with respect to the aeroplanes, though when my invention is embodied in monoplane structures, I prefer to dispose the centers of gravity in the same general planes with the aeroplanes.

An air ship constructed in accordance with the preferred embodiment of my invention includes an aeroplane in the form of a ring-like element which is desirably continuous, though I do not wish to be limited to a continuous ring-like element. This ring-like element is coöperatively related with a subsidiary aeroplane that is preferably merged with the first aeroplane which constitutes the main aeroplane. This subsidiary aeroplane is itself desirably in the form of a ring-like element that is preferably continuous and is angularly disposed with respect to the main aeroplane, and is desirably sloped toward a common point which is included in a line perpendicular to the main aeroplane and preferably passing through its geometrical center. The subsidiary aeroplane is preferably located at the inner edge of the main aeroplane, and in such event slopes downwardly toward the opening and the perpendicular line mentioned. The space surrounded by the aeroplanes is sufficiently large and sufficiently free of structural parts to permit of the ready passage of air therethrough, whereby the subsidiary aeroplane is enabled to coöperate with the main aeroplane to stabilify the ship whether the propelling mechanism is in operation or at rest and irrespective of the direction in which the ship is moving relative to the vertical and horizontal. I provide suitable means as component parts of the ship for guiding its course with respect to the vertical and with respect to the horizontal, the preferred form of my invention desirably including one rudder for steering the course of the ship with respect to the vertical and another rudder for steering the course of the ship with respect to the horizontal, though I do not wish to be limited to a structure employing two steering devices.

While I prefer to employ main and subsidiary aeroplane elements angularly disposed to each other, as illustrated and described, yet I do not wish to be limited to the described structure, for the reason that an important feature of the invention is the disposition of the aeroplane part which I have designated as the subsidiary aeroplane or stabilifying element, at an inclination to the vertical axis of the machine as a whole.

I will more fully explain my invention and point out further features thereof in connection with the accompanying drawings showing one embodiment of the invention, and in which—

Figure 1 is a plan view of an air ship constructed in accordance with the invention; Fig. 2 is a side view of the structure shown in Fig. 1; Fig. 3 is a sectional elevation on line 3 3 of Fig. 1; and Fig. 4 is a sectional view of a part of the structure.

Like parts are indicated by similar characters of reference throughout the different figures.

The main aeroplane $a$ is, in the form of the invention illustrated, a ring-like structure bounded by inner and outer nine sided concentric polygons, and the substance of this main aeroplane is flat and continuous. The main aeroplane is secured to ribs $b$ located in the same plane therewith, these ribs passing at their outer ends through corners of the polygons, and united at their inner ends with a common anchorage $c$, said ribs thus constituting spokes and the anchorage element thus constituting a hub. The hub is fixed to a shaft $d$ concentric therewith and concentric with the polygons of the main aeroplane, this shaft in effect constituting a mast and desirably projecting both above and below the plane which includes the main aeroplane and the spokes. Suitable guys $e$ intervene between the mast and other portions of the ship structure for the purpose of maintaining the aeroplane perpendicular to the mast. Other guys $f$ intervene directly between the spokes for maintaining them fixed distances apart, and still other guys $g$ intervene between the legs $h$ and the mast, said legs carrying rotatable elements $i$ at the lower ends, these rotatable elements being provided for the purpose of enabling the ship to travel over the ground when its flight is being initiated. The propeller $k$ is shown at the rear and the engine $l$ for operating it is shown as being mounted upon the mast. The engine mechanism and the propeller mechanism may be of any suitable design, and the operation of the engine and the control of the propeller may be regulated in suitable ways which do not form novel features of my invention and which therefore need not be described in detail.

I have shown a rudder plane $m$ for determining the position of the ship with respect to the horizontal, suitable steering gear $n$ being employed for swinging said rudder plane about an axis lying in the general plane of the main aeroplane, whereby the ship may be moved in a horizontal plane or may be inclined upwardly or downwardly as desired, and inasmuch as the steering gear forms no novel part of my present invention, a detailed description thereof will not be given, it sufficing to state that the axis about which the rudder plane $m$ swings is at right angles to the line of travel of the ship, or in other words, is at right angles to the length of the ship. Another rudder plane $p$ has an axis of rotation which is substantially perpendicular to the aeroplane $a$ and may be moved throughout a predetermined range of travel by means of suitable steering gear $q$ which will not be specifically described as it forms no novel part of my present invention, it sufficing to state that it includes the drum $q'$ about which steering cords $q^2$ are adapted to be reversely wound, so that as the drum is rotated the cords are wound and unwound to shift the rudder plane $p$, a steering wheel $q^4$ being splined upon the shaft of the drum and so connected with the rudder plane $m$ that movement of the wheel longitudinally of said shaft will adjust the position of the rudder plane $m$, it being understood of course that a rotation of said wheel will cause an adjustment of the rudder plane $p$. The rudder plane $p$ serves to steer the course of the ship with respect to the vertical whether the ship is moving in a horizontal direction or in directions inclined upwardly or downwardly with respect to the horizontal as determined by the rudder plane $m$. I have shown two rudder planes having the functions specified, the rudder plane $m$ being at the prow of the ship, while the rudder plane $p$ is aft of the mast, but I do not wish to be limited to the use of two rudder planes nor to the locations thereof illustrated.

The subsidiary aeroplane $r$ that forms a very essential part of my present invention is preferably in the form of a ring-like structure bounded by inner and outer nine sided concentric polygons that are concentric with the polygons of the main aeroplane. The outer edge portions of the subsidiary aeroplane are desirably joined or merged with the inner edge portions of the main aeroplane. In view of the described and illustrated location of the subsidiary or stabilifying aeroplane, it is deflected or sloped downwardly and toward the mast $d$, or, in other words, the surface portions of the stabilifying member are substantially symmetrically inclined with respect to a central axis represented by the mast.

As I have embodied my invention, the area inclosed by the main aeroplane and the area of said main aeroplane itself are in the proportion of four to five. The dimension of the subsidiary aeroplane taken between its adjacent inner and outer edges and in the direction of a spoke $b$ is small as compared with the dimension of the main aeroplane similarly taken, and the subsidiary aeroplane therefore does not materially decrease the area of the opening inclosed by the main aeroplane and does not project very far away from the main aeroplane, so that the passage of air to any portion of the subsidiary aeroplane is not materially obstructed, whereby, when the main aeroplane does not slope too precipitately with respect to the horizontal, the forward portions of the subsidiary aeroplane are acted upon by the air to have an elevating effect upon the forward portion of the ship, the rear portions of the subsidiary aeroplane are acted upon by the air to have a depressing effect upon the rear portion of the ship, and lateral portions of the subsidiary aeroplane are acted upon to prevent the ship from improperly listing, whereby said subsidiary aeroplane becomes an efficient stabilifying aeroplane. For example, should the forward end of the machine tend to dip downward with respect to the normal direction of travel, the air acting upon the forward portion of the stabilifying aeroplane immediately tends to lift the forward portion of the machine and, at the same time, the air currents above the forward portion of the machine, which find free passage through the open portion of the machine, or in the alternative, the air currents sweeping from below the machine, impinge upon the rearward section of the stabilifying plane and exercise a depressing effect upon the after part of the machine, and the effect of these two sets of air currents is to right the machine and bring it back into its normal course immediately. A similar effect is produced should the machine tend to list to one side or the other. This function of the stabilifying element is called into play under all conditions of operation, whether the machine is traveling in a forward direction, or is moving rearwardly, either under power, or when the machine is drifting or gliding. The main and stabilifying aeroplane elements thus constitute a unitary aeroplane having buoying and stabilifying functions, and while the main and stabilifying aeroplanes are desirably merged at their adjacent edges, I do not wish to be limited to a unitary buoying and stabilifying aeroplane in which the buoying and stabilifying parts are merged. The portions of the subsidiary aeroplane are preferably all so related to each other that there is, during the times that the main aeroplane does not slope too precipitately with respect to the horizontal, an elevating influence, due to the impingement of the air thereupon, upon an advance portion of the ship, and a depressing influence upon the part of the ship opposite the advance portion, irrespective of the direction of movement of the ship with respect to its prow; for example, if the ship is backing, there is then an elevating influence upon the rear portion of the ship and a depressing influence upon the front portion of the ship, and when the ship is moving sidewise, the side of the ship that is advancing has an elevating influence exerted thereupon and the side opposite the advancing side has a depressing influence exerted thereupon. When the angle at which the ship is moving does become too precipitate with respect to the horizontal, the main and subsidiary aeroplanes coöperate to bring the ship to a less precipitate angle. The stabilifying function of the subsidiary aeroplane is performed not only while the ship is being propelled but also while it is being permitted to glide, and my invention is therefore not only of advantage in connection with ships that are actually propelled, but also in connection with flying machines that are unprovided with propelling mechanism. The stabilifying effect is insured by having the subsidiary aeroplane continuous and with all diametrically opposite portions thereof sloping from the same face of the main aeroplane at uniform angles. In the preferred embodiment of the invention, all diametrically opposite sides of the subsidiary aeroplane slope in opposite directions, with respect to the vertical axis of the machine.

The center of gravity $s$ of the ship is located in a line that is perpendicular to the main aeroplane and in front of its geometrical center, and, in the case of monoplanes, this center of gravity is desirably included in the general plane of the main aeroplane. The center of gravity is located sufficiently forward of the mast so that the excess of weight before the mast will have a depressing tendency upon the forward part of the ship which will coöperate with the tendency of the air to elevate the ship exerted at its forward portion and the tendency of the air to depress the ship exerted at its rear portion to maintain the main aeroplane substantially horizontal with the plane $m$ properly adjusted when the ship is being propelled or when the ship is gliding, the ship gliding when the propelling mechanism is out of action. Thus, in the event of accident to the propelling mechanism, the ship is adapted to settle evenly and to descend with its main aeroplane substantially horizontally disposed. Moreover, the preponderance of the weight being forward of the mast will cause the ship in settling, while not being propelled, to face the air currents encountered, thereby further insuring the orderly and safe descent of the ship.

While I have herein shown and specifically described the preferred embodiment of my invention, I do not wish to be limited to the precise details of construction shown, as changes may readily be made without departing from the spirit of the invention.

Having thus described my invention, I claim as new and desire to secure by Letters Patent the following:—

1. A flying machine including adjacent main and stabilifying aeroplane elements, the main aeroplane element having an opening about which the surface portions of each of the aforesaid aeroplane elements are distributed, the surface portions of the stabilifying aeroplane element being located at the inner edge of the main aeroplane element and sloping downwardly therefrom with respect to the vertical axis of the machine, said opening permitting air freely to pass therethrough and to impinge upon portions of the stabilifying aeroplane element adjacent to the main aeroplane element.

2. A flying machine including adjacent main and stabilifying aeroplane elements, the main aeroplane element having an opening about which the surface portions of each of the aforesaid aeroplane elements are distributed, the surface portions of the stabilifying aeroplane element lying upon the same side of the general plane of the main aeroplane element and substantially symmetrically inclined with respect to the vertical axis of the machine, said opening permitting air freely to pass therethrough and to impinge upon the stabilifying aeroplane element adjacent to the main aeroplane element, the center of gravity of the machine being disposed forward of the geometrical center thereof.

3. A flying machine including adjacent main and stabilifying aeroplane elements, the main aeroplane element having an opening about which the surface portions of each of the aforesaid aeroplane elements are distributed, the surface portions of the stabilifying aeroplane element being inclined with respect to the main aeroplane element, said opening permitting air freely to pass therethrough and to impinge upon the stabilifying aeroplane element adjacent to the main aeroplane element, the center of gravity of the machine being disposed forward of the geometrical center thereof.

4. A flying machine including adjacent angularly related main and stabilifying aeroplane elements, the main aeroplane element having an opening about which the surface portions of each of the aforesaid aeroplane elements are distributed, the stabilifying aeroplane element being located adjacent the said opening of the main aeroplane element, said opening permitting air freely to pass therethrough and to impinge upon portions of the stabilifying aeroplane element adjacent to the main aeroplane element, the center of gravity of the machine being disposed forward of the geometrical center thereof.

5. A flying machine including adjacent angularly related main and subsidiary aeroplane elements, the main aeroplane element having an opening permitting air freely to pass therethrough and to impinge upon the subsidiary aeroplane element adjacent to the main aeroplane element, the center of gravity of the machine being disposed forward of the geometrical center thereof.

6. A flying machine including main and subsidiary aeroplane elements, the main aeroplane element having an opening permitting air freely to pass therethrough and to impinge upon the subsidiary aeroplane element, said subsidiary aeroplane element having an inclined portion forward of the machine to enable the air to exert an elevating tendency at the forward portion of the machine and having another oppositely inclined portion at the rear of the machine to enable the air to have a depressing effect upon the rear portion of the machine, the center of gravity of the machine being disposed forward of the geometrical center thereof.

7. A flying machine including a unitary buoying and stabilifying aeroplane having an opening therethrough to permit of the free passage of air to act upon the stabilifying portion, the said stabilifying portion being inclined with respect to the vertical axis of the machine.

8. A flying machine including a unitary buoying and stabilifying aeroplane having an opening therethrough to permit of the free passage of air to act thereupon, portions of said unitary aeroplane on opposite sides of said opening being substantially symmetrically inclined with respect to the central axis of the machine.

9. A flying machine comprising a ring-like aeroplane member having an open center, and a stabilifying rim adjacent to the opening and inclined with respect to the central axis of the machine, the center of gravity of the machine being disposed forward of the geometrical center thereof.

10. A flying machine comprising a ring-like aeroplane member having an open center, and a stabilifying rim disposed about the inner edge of said member and inclined with respect to the surface of said member.

11. A flying machine comprising a ring-like aeroplane member having an open center, and a stabilifying rim located adjacent the under surface and inner edge of said ring-like member, said rim being inclined with respect to the vertical axis of the machine.

12. A flying machine including a buoying and stabilifying aeroplane structure distributed about an opening to permit of the free passage of air therethrough and to act upon the stabilifying surface portion, the stabilifying portion being angularly related to the vertical axis of the machine.

In witness whereof, I hereunto subscribe my name this eighth day of March, A. D., 1910.

WILLIAM S. ROMME.

Witnesses:
G. L. Cragg,
R. E. Atherton.

Copies of this patent may be obtained for five cents each, by addressing the "Commissioner of Patents, Washington, D. C."